US009811745B2

(12) United States Patent
Nakamura et al.

(10) Patent No.: US 9,811,745 B2
(45) Date of Patent: Nov. 7, 2017

(54) APPROACHING-OBJECT DETECTION SYSTEM AND VEHICLE

(71) Applicant: Clarion Co., Ltd., Saitama-shi, Saitama (JP)

(72) Inventors: Katsuyuki Nakamura, Tokyo (JP); Yasuhiro Akiyama, Tokyo (JP); Kota Irie, Saitama (JP)

(73) Assignee: Clarion Co., Ltd., Saitama-shi (JP)

( * ) Notice: Subject to any disclaimer, the term of this patent is extended or adjusted under 35 U.S.C. 154(b) by 62 days.

(21) Appl. No.: 14/892,961

(22) PCT Filed: May 29, 2014

(86) PCT No.: PCT/JP2014/064225
§ 371 (c)(1),
(2) Date: Nov. 20, 2015

(87) PCT Pub. No.: WO2015/001878
PCT Pub. Date: Jan. 8, 2015

(65) Prior Publication Data
US 2016/0098606 A1    Apr. 7, 2016

(30) Foreign Application Priority Data
Jul. 3, 2013 (JP) ................ 2013-139436

(51) Int. Cl.
*G06K 9/00* (2006.01)
*G06T 7/00* (2017.01)
(Continued)

(52) U.S. Cl.
CPC .......... *G06K 9/00805* (2013.01); *B60R 1/00* (2013.01); *G06K 9/00825* (2013.01);
(Continued)

(58) Field of Classification Search
CPC ......... G06K 9/00805; G06K 2009/363; G06K 9/00825; G06T 2207/30261; B60R 1/00; B60R 2300/30
See application file for complete search history.

(56) References Cited

U.S. PATENT DOCUMENTS

2007/0152804 A1\* 7/2007 Breed ................ B60N 2/2863
340/435
2008/0089557 A1\* 4/2008 Iwaki ...................... G01C 3/06
382/106
(Continued)

FOREIGN PATENT DOCUMENTS

JP         9-282452 A    10/1997
JP      2009-151524 A     7/2009
(Continued)

OTHER PUBLICATIONS

International Search Report (PCT/ISA/210) issued in counterpart International Application No. PCT/JP2014/064225 dated Sep. 9, 2014, with English translation (Five (5) pages).
(Continued)

*Primary Examiner* — Jon Chang
(74) *Attorney, Agent, or Firm* — Crowell & Moring LLP

(57) ABSTRACT

An approaching-object detection system detects an approaching object based on images captured by an imaging device. The approaching-object detection system comprises an extraction unit, a distortion correction unit, an object detection unit, and an approaching-object classification unit. The extraction unit extracts a partial image of one far side and a partial image of the other far side from each of the images. The distortion correction unit corrects distortion of the partial images. The object detection unit detects an object from the corrected partial images through pattern matching with reference to preinstalled image information on the object. The approaching-object classification unit classifies the detection result of the object detection unit as an approaching object or not.

13 Claims, 12 Drawing Sheets

(51) Int. Cl.
    *G06T 7/20*        (2017.01)
    *B60R 1/00*        (2006.01)
    *G06K 9/36*        (2006.01)

(52) U.S. Cl.
    CPC .... *B60R 2300/30* (2013.01); *G06K 2009/363* (2013.01); *G06T 2207/30261* (2013.01)

(56) References Cited

U.S. PATENT DOCUMENTS

| | | |
|---|---|---|
| 2009/0160940 A1 | 6/2009 | Imamura |
| 2010/0103264 A1 | 4/2010 | Nagao |
| 2011/0128138 A1 | 6/2011 | Yamamoto et al. |
| 2014/0232538 A1* | 8/2014 | Sobue ................. B60R 1/00 340/435 |

FOREIGN PATENT DOCUMENTS

| | | |
|---|---|---|
| JP | 2009-237887 A | 10/2009 |
| JP | 2010-109483 A | 5/2010 |
| JP | 2010-157118 A | 7/2010 |
| JP | 2010-268520 A | 11/2010 |
| JP | 2011-118482 A | 6/2011 |
| WO | WO 2013/046409 A1 | 4/2013 |

OTHER PUBLICATIONS

Japanese language Written Opinion (PCT/ISA/237) issued in counterpart International Application No. PCT/JP2014/064225 (Three (3) pages).

* cited by examiner

DETECTING OBJECT APPROACHING FROM SIDES WITH WIDE-ANGLE CAMERA ATTACHED ON FRONT OF VEHICLE

DETECTING OBJECT APPROACHING FROM SIDES WITH WIDE-ANGLE CAMERA ATTACHED ON REAR OF VEHICLE

DETECTING OBJECT APPROACHING FROM REAR LEFT WITH WIDE-ANGLE CAMERA
ATTACHED ON LEFT SIDE OF VEHICLE

DETECTING OBJECT APPROACHING FROM REAR RIGHT WITH WIDE-ANGLE CAMERA
ATTACHED ON RIGHT SIDE OF VEHICLE

US 9,811,745 B2

APPROACHING-OBJECT DETECTION SYSTEM AND VEHICLE

CLAIM OF PRIORITY

The present application claims priority from Japanese patent application JP 2013-139436 filed on Jul. 3, 2013, the content of which is hereby incorporated by reference into this application.

BACKGROUND OF THE INVENTION

This invention relates to an approaching-object detection system for detecting an approaching object based on images captured by an imaging device.

To reduce the casualties by traffic accidents, safety systems for preventing accidents have been developed. The safety system is activated when an accident is likely to happen; for example, there is a commercialized system that detects a moving object (such as a vehicle, a pedestrian, or a two-wheel vehicle) with a view camera mounted on the rear of a vehicle to warn the driver with an alarm when the vehicle may collide with the moving object.

Background arts of this technical field include WO 2013/046409 A.

WO 2013/046409 A discloses that: A drive assisting display device (1) provided with a rear wide-angle camera (11), an ECU (20) for displaying a rear image captured by means of the rear wide-angle camera (11), and a display (30), wherein the display control unit (25) of the ECU (20) and the display (30) display the rear image by dividing same onto a right-and-left rear screen (204) and a center rear screen (202), detect the object captured in the image on the center rear screen (202) by cross-checking the image with a predetermined pattern, detect the object captured in the image on the right-and-left rear screen (204) by analyzing the direction in which a point in the image moves as time passes and the speed by which said point moves in said time period, and display a moving object approach detection frame (210) and a pedestrian detection frame (212) which show the presence of the detected objects. As a consequence, people and such who are stopped in the vicinity of the front of the vehicle (100) are detected by means of a pattern matching method, and vehicles and such which are approaching the vehicle (100) from afar are detected by means of an optical flow method, thereby being able to notify a driver of the presence of the detected vehicles and people (Abstract).

SUMMARY OF THE INVENTION

For the aforementioned safety systems, there is a demand that an approaching object be detected at an earliest possible occasion for the driver to apply the brake.

The device according to WO 2013/046409 A detects an object approaching from the side using an optical flow method; however, the optical flow method has a problem that it is difficult to detect an object showing small motion in the image. When this device is mounted on a vehicle, an approaching object cannot be detected unless the object approaches relatively close to the vehicle; the foregoing demand cannot be satisfied.

This invention aims to provide an approaching-object detection system that can detect an approaching object at an earliest possible occasion.

According to an aspect of the present invention, there is provided an approaching-object detection system for detecting an approaching object based on images captured by an imaging device, the approaching-object detection system comprising: an extraction unit configured to extract a partial image of one far side and a partial image of the other far side from each of the images; a distortion correction unit configured to correct distortion of the partial images extracted by the extraction unit; an object detection unit configured to detect an object from the partial images corrected in distortion by the distortion correction unit through pattern matching with reference to preinstalled image information on the object; and an approaching-object classification unit configured to classify the detection result of the object detection unit as an approaching object or not.

A brief description is now given of effects provided by the exemplary embodiment of this invention disclosed in this application. This invention enables to provide an approaching-object detection system that can detect an approaching object at an earliest possible occasion.

Other objects, configurations, and effects than those described above are revealed in the following description of an embodiment.

BRIEF DESCRIPTION OF THE DRAWINGS

The present invention can be appreciated by the description which follows in conjunction with the following figures, wherein.

DETAILED DESCRIPTION OF THE EMBODIMENTS

Hereinafter, embodiments are described with the drawings.
Embodiment 1

Figure 1:
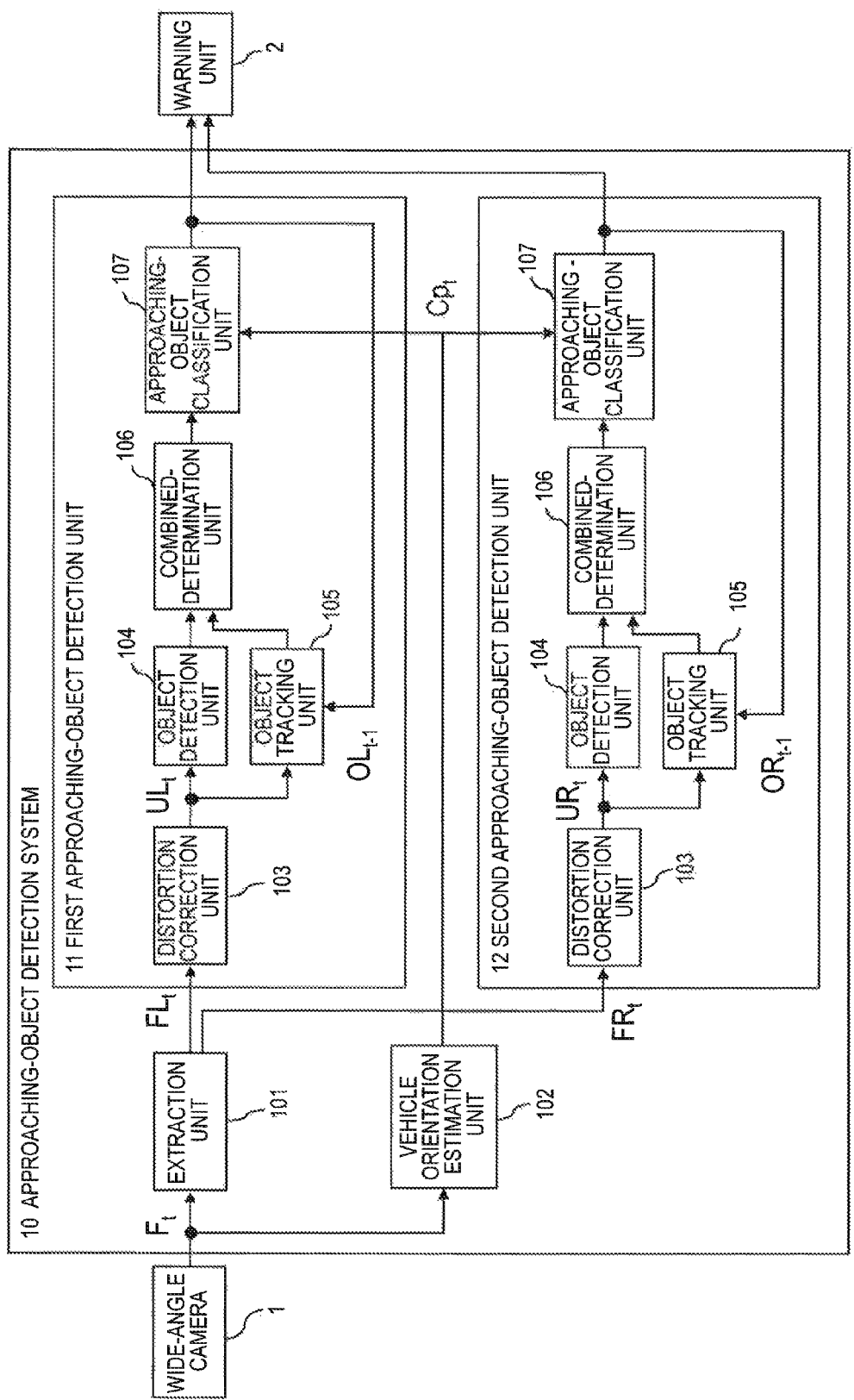
FIG. 1 is a block diagram of an approaching-object detection system in Embodiment 1 of this invention.

FIG. 1 is a block diagram of an approaching-object detection system 10 in Embodiment 1 of this invention.

A wide-angle camera 1 is mounted on a vehicle, for example, and has a view angle of approximately 180 degrees. The approaching-object detection system 10 detects an object approaching the vehicle based on the images captured by the wide-angle camera 1 and outputs information on the approaching object to a warning unit 2 upon detection of an approaching object.

The approaching-object detection system 10 includes an extraction unit 101, a vehicle orientation estimation unit 102, a first approaching-object detection unit 11, and a second approaching-object detection unit 12. In this description, the first approaching-object detection unit 11 and the second approaching-object detection unit 12 are generally referred to as approaching-object detection unit as necessary.

The extraction unit 101 extracts a leftmost partial image $FL_t$ and a rightmost partial image $FR_t$ from an image $F_t$ captured by the wide-angle camera 1. The vehicle orientation estimation unit 102 estimates a camera orientation parameter $Cp_t$ indicating the orientation of the wide-angle camera 1 based on the orientation of the vehicle. The leftmost partial image $FL_t$ and the rightmost partial image $FR_t$ are generally referred to as partial image.

The first approaching-object detection unit 11 detects an approaching object based on the leftmost partial image $FL_t$ and the second approaching-object detection unit 12 detects an approaching object based on the rightmost partial image $FR_t$. The first approaching-object detection unit 11 and the second approaching-object detection unit 12 each has a distortion correction unit 103, an object detection unit 104, an object tracking unit 105, a combined-determination unit 106, and an approaching-object classification unit 107.

Hereinafter, processing by the individual units is described using an example of the first approaching-object detection unit 11.

The distortion correction unit 103 that has received a leftmost partial image $FL_t$ corrects distortion of the leftmost partial image $FL_t$ by converting the leftmost partial image $FL_t$ into a leftmost partial perspective image $UL_t$ and feeds the leftmost partial perspective image $UL_t$ to the object detection unit 104 and the object tracking unit 105.

The object detection unit 104 that has received the leftmost partial perspective image $UL_t$ detects an object from the received leftmost partial perspective image $UL_t$ through pattern matching. The details of the object detection unit 104 are described with FIGS. 4, 5A, and 5B. The object tracking unit 105 that has received the leftmost partial perspective image $UL_t$ tracks an object by comparing the received leftmost partial perspective image $UL_t$ with object information $OL_{t-1}$, which is information on approaching objects previously provided by the approaching-object classification unit 107.

The combined-determination unit 106 determines whether there is consistency between a detection result and a tracking result based on the object detected by the object detection unit 104 and the object tracked by the object tracking unit 105. A specific method of determining the consistency is described in detail with FIG. 3.

The approaching-object classification unit 107 classifies an object detected by the object detection unit 104 as an approaching object or not based on the camera orientation parameter $Cp_t$ provided by the vehicle orientation estimation unit 102 and the variation with time in feature value of the object.

When at least either the approaching-object classification unit 107 of the first approaching-object detection unit 11 or the approaching-object classification unit 107 of the second approaching-object detection unit 12 detects an approaching object, the warning unit 2 outputs an alarm.

Each unit of the approaching-object detection system 10 may be hardware or software, or otherwise, may be a module of a combination of hardware and software.

Figure 2:
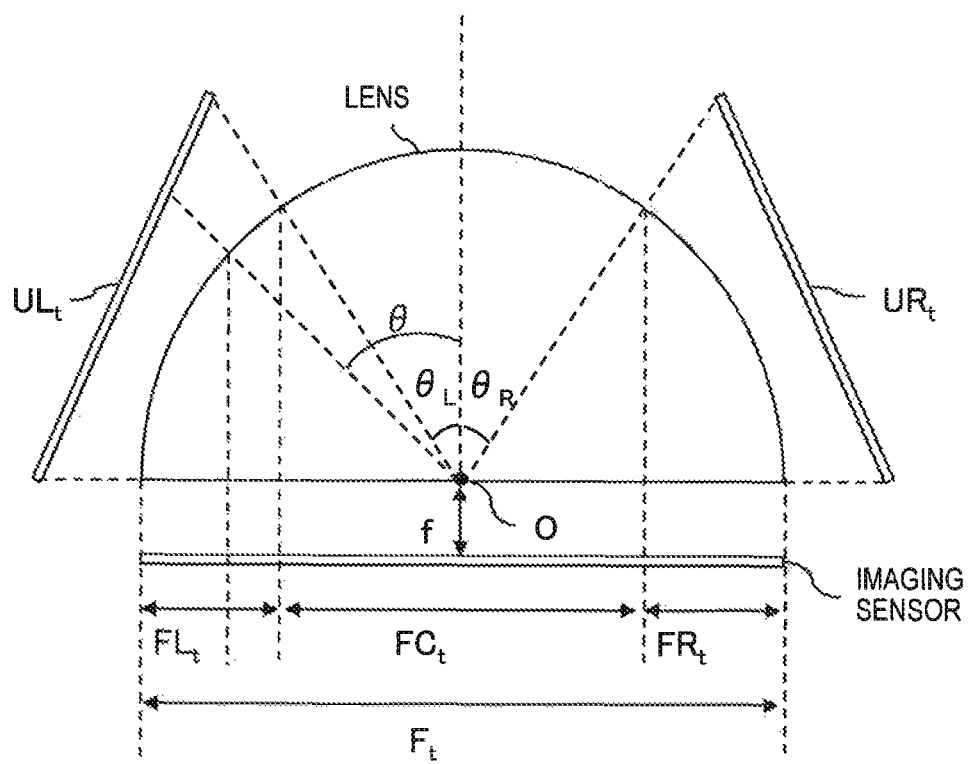
FIG. 2 is an explanatory diagram of an image $F_t$ captured by a wide-angle camera in Embodiment 1 of this invention.

FIG. 2 is an explanatory diagram of an image $F_t$ captured by the wide-angle camera 1 in Embodiment 1 of this invention.

As mentioned above, the wide-angle camera 1 has a view angle of approximately 180 degrees; the wide-angle camera 1 can take an image ranging from the left side to the right side of a vehicle if the wide-angle camera 1 is mounted on the front or the rear of the vehicle and can take an image ranging from the front to the rear of the vehicle if the wide-angle camera is mounted on either side of the vehicle.

In FIG. 2, O represents the center of the lens; f represents the focal length or a distance between the lens and the imaging sensor; and θ represents the incident angle.

Light incident onto the lens at an incident angle θ refracts perpendicularly at the incident point of the lens and reaches the imaging sensor. The image captured by the entire area of the imaging sensor is assumed to be an image $F_t$. The extraction unit 101 sections the image $F_t$ into a partial image on the left of a given incident angle $θ_L$, a partial image on the right of a given incident angle $θ_R$, and a partial image ranging from the right of the incident angle $θ_L$ to the left of the incident angle $θ_R$, extracts the partial image on the left of the incident angle $θ_L$ as a leftmost partial image $FL_t$ and the partial image on the right of the incident angle $θ_R$ as a rightmost partial image $FR_t$. In FIG. 2, the partial image ranging from the right of the incident angle $θ_L$ to the left of the incident angle $θ_R$ is shown as central partial image $FC_t$.

The distortion correction unit 103 of the first approaching-object detection unit 11 corrects the distortion by converting the leftmost partial image $FL_t$ to a leftmost partial perspective image $UL_t$ using internal parameters of the wide-angle camera 1 (such as the focal length f, the size of the imaging sensor, the image height function, and the like) and external parameters of the wide-angle camera 1 (such as the mounting position and the mounting angle of the wide-angle camera 1). The distortion correction unit 103 of the second approaching-object detection unit 12 likewise corrects the distortion by converting the rightmost partial image $FR_t$ to a rightmost partial perspective image $UR_t$. The image height function is a function defining the imaging position with respect to the incident angle.

Figure 3:
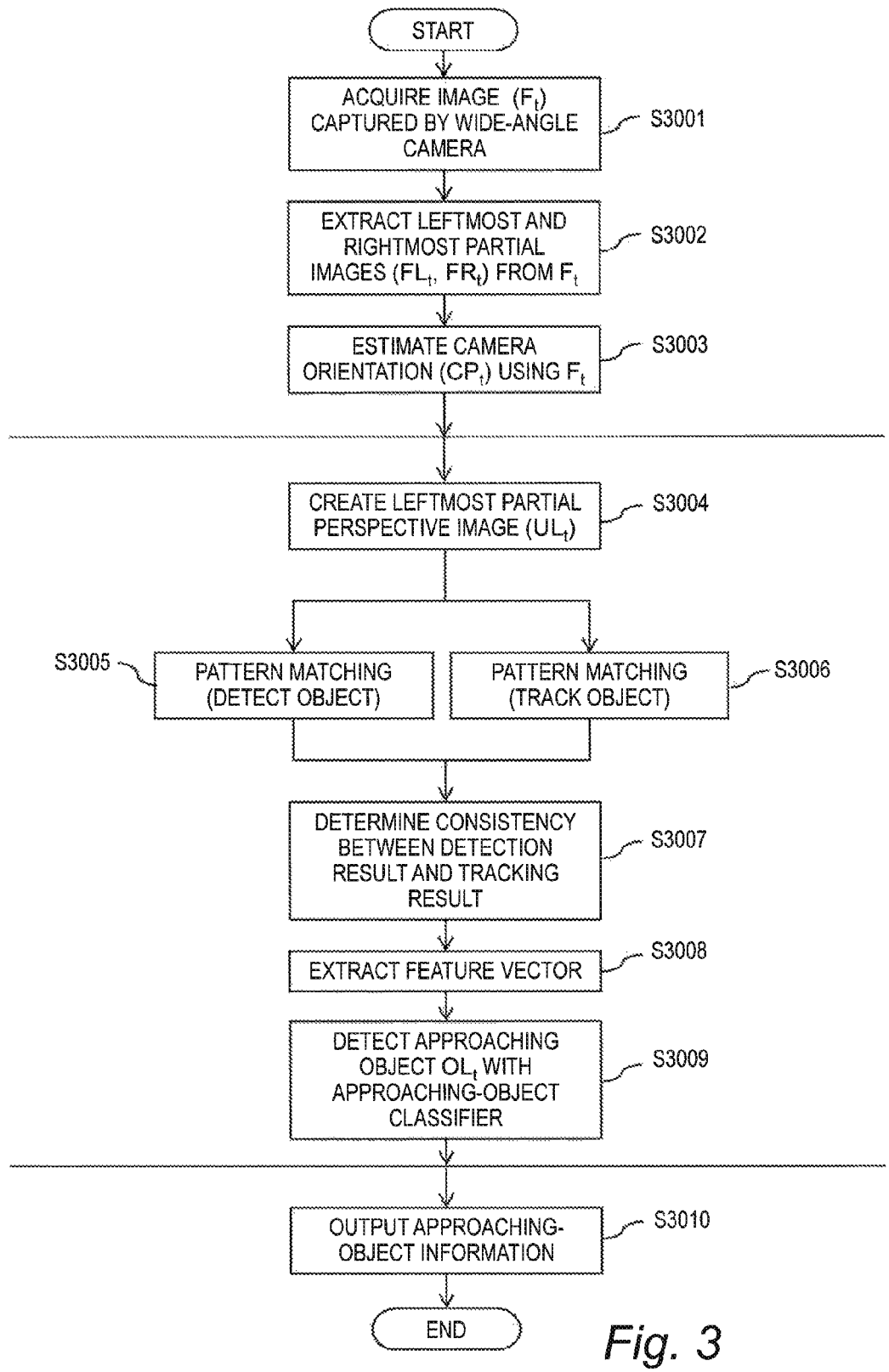
FIG. 3 is a flowchart of processing performed in the approaching-object detection system in Embodiment 1 of this invention.

FIG. 3 is a flowchart of the processing performed in the approaching-object detection system 10 in Embodiment 1 of this invention.

First, the approaching-object detection system 10 acquires an image $F_t$ captured by the wide-angle camera 1 (S3001). The extraction unit 101 extracts a leftmost partial image $FL_t$ and a rightmost partial image $FR_t$ from the image $F_t$ acquired at S3001 (S3002), feeds the extracted leftmost partial image $FL_t$ to the first approaching-object detection unit 11, and feeds the extracted rightmost partial image $FR_t$ to the second approaching-object detection unit 12.

The vehicle orientation estimation unit 102 estimates a variation from the design value in the orientation of the vehicle on which the wide-angle camera 1 is mounted and calculates a camera orientation parameter $Cp_t$ representing the orientation of the wide-angle camera 1 as of the current time based on the estimated variation in vehicle orientation (S3003). The orientation of the wide-angle camera 1 represented by the camera orientation parameter $Cp_t$ that the vehicle orientation estimation unit 102 calculates can be the depression angle of the wide-angle camera 1. Then, a camera depression angle estimation method used for lane departure warning or forward collision warning can be used to calculate the camera orientation parameter $Cp_t$. In the camera depression angle estimation method, the vehicle orientation estimation unit 102 detects a lane from the image $F_t$ captured by the wide-angle camera 1 and calculates a depression angle of the wide-angle camera 1 from the inclination of the detected lane to obtain the camera orientation parameter $Cp_t$.

The first approaching-object detection unit 11 detects an object approaching from the left of the wide-angle camera 1 based on the received leftmost partial image $FL_t$ and the second approaching-object detection unit 12 detects an object approaching from the right of the wide-angle camera 1 based on the received rightmost partial image $FR_t$. Since the processing of the first approaching-object detection unit 11 and the processing of the second approaching-object detection unit 12 are the same, the processing of the first approaching-object detection unit 11 is described by way of example.

First, the distortion correction unit 103 of the first approaching-object detection unit 11 converts the received leftmost partial image $FL_t$ into a leftmost partial perspective image $UL_t$ by correcting the distortion of the leftmost partial image $FL_t$ and feeds the leftmost partial perspective image $UL_t$ to the object detection unit 104 and the object tracking unit 105 (S3004).

The object detection unit 104 that has received the leftmost partial perspective image $UL_t$ detects an object from the received leftmost partial perspective image $UL_t$ through pattern matching (S3005) and feeds the detection result to the combined-determination unit 106. The processing of the object detection unit 104 is described in detail with FIGS. 4, 5A and 5B. The detection result of the object detection unit 104 includes the kind (vehicle, pedestrian, motorcycle, or the like) of the detected object and the coordinates indicating the position of the detected object.

The object tracking unit 105 that has received the leftmost partial perspective image $UL_t$ tracks an object by comparing the leftmost partial perspective image $UL_t$ with object information as of the previous time $(OL_{t-1})$ (S3006) and feeds the tracking result to the combined-determination unit 106. For example, the object tracking unit 105 detects images of the objects included in the object information as of the previous time $(OL_{t-1})$ from the leftmost partial perspective image $UL_t$ to track the objects. The tracking result of the object tracking unit 105 includes the type of each tracked object and the coordinates of the current position of each tracked object.

In comparing the leftmost partial perspective image $UL_t$ with the object information as of the previous time $(OL_{t-1})$, the object tracking unit 105 may employ at least one of the SAD (sum of absolute difference), the normalized cross-correlation, an edge-based evaluation measure, likelihood information, and the like as the evaluation measure.

Upon receipt of a detection result from the object detection unit 104 and a tracking result from the object tracking unit 105, the combined-determination unit 106 determines whether there is consistency between the detection result and the tracking result (S3007). For example, if an object newly detected by the object detection unit 104 is being tracked by the object tracking unit 105, the combined-determination unit 106 determines that there is no consistency between the detection result and the tracking result because the object has been tracked since the previous object information $OL_{t-1}$ whereas the object has been newly detected. The previous object information $OL_{t-1}$ is information on objects classified as approaching objects by the approaching-object classification unit 107 and includes the coordinates of the positions of the objects, for example. The situation where an object is being tracked by the object tracking unit 105 means a situation where the object tracking unit 105 has detected the object in the object information as of the previous time $(OL_{t-1})$ from the leftmost partial perspective image $UL_t$.

If the combined-determination unit 106 determines that there is no consistency between the detection result and the tracking result, the combined-determination unit 106 estimates the current position of the object included in the previous object information $OL_{t-1}$ from the position in the previous object information $OL_{t-1}$ and feeds the result indicating the object closer to the estimated position between the detection result of the object detection unit 104 and the tracking result of the object tracking unit 105 to the approaching-object classification unit 107. The combined-determination unit 106 determines that the result indicating the object farther from the estimated position between the detection result of the object detection unit 104 and the tracking result of the object tracking unit 105 is a false detection and discards this result. As a result, even if the object detection unit 104 or the object tracking unit 105 has falsely detected an object, the false detection can be corrected.

Next, the approaching-object classification unit 107 calculates a feature vector (feature value) of the object detected by the object detection unit 104 and the object tracking unit 105 (S3008). The approaching-object classification unit 107 calculates at least one of the width of the object in the image, the height of the object in the image, the coordinates of the grounding point of the object, the edge strength of the object, the texture frequency, the rectangle expansion rate, and the actual pixel count of the object (object pixel count) as a feature vector.

The approaching-object classification unit 107 determines whether the object detected by the object detection unit 104 and the object tracking unit 105 is an approaching object (in other words, whether the object detected by the object detection unit 104 and the object tracking unit 105 is not a false detection) based on the variation with time in the feature vector calculated in the processing of S3008 (S3009). The processing of S3009 is described in detail with FIGS. 6A and 6B.

The second approaching-object detection unit 12 performs the processing of S3004 to S3009 on the rightmost partial image $FR_t$.

If at least either the processing of S3009 performed by the first approaching-object detection unit 11 or the processing of S3009 performed by the second approaching-object detection unit 12 determines that the object detected by the object detection unit 104 and the object tracking unit 105 is an approaching object, the warning unit 2 outputs information on the approaching object (for example, the position and the speed of the approaching object) (S3010) and the approaching-object detection system 10 terminates the processing.

As described above, the approaching-object detection system 10 in this embodiment detects an approaching object from the leftmost partial image and the rightmost partial image of an image captured by the wide-angle camera 1 through pattern matching; accordingly, even if the image of the approaching object is small, the system 10 can detect the approaching object, achieving detection of the approaching object at an earliest possible occasion.

The object detection unit 104 and the object tracking unit 105 usually use one or two frames of captured images in pattern matching to detect an object; for this reason, the possibility of false detection is high. Accordingly, the approaching-object classification unit 107 calculates a feature vector of the object detected by the object detection unit 104 and the object tracking unit 105 and classifies the object as an approaching object or not based on the variation with time in the calculated feature vector to detect an approaching object. As a result, the false detection of approaching objects is reduced and highly practical performance can be attained.

Figure 4:
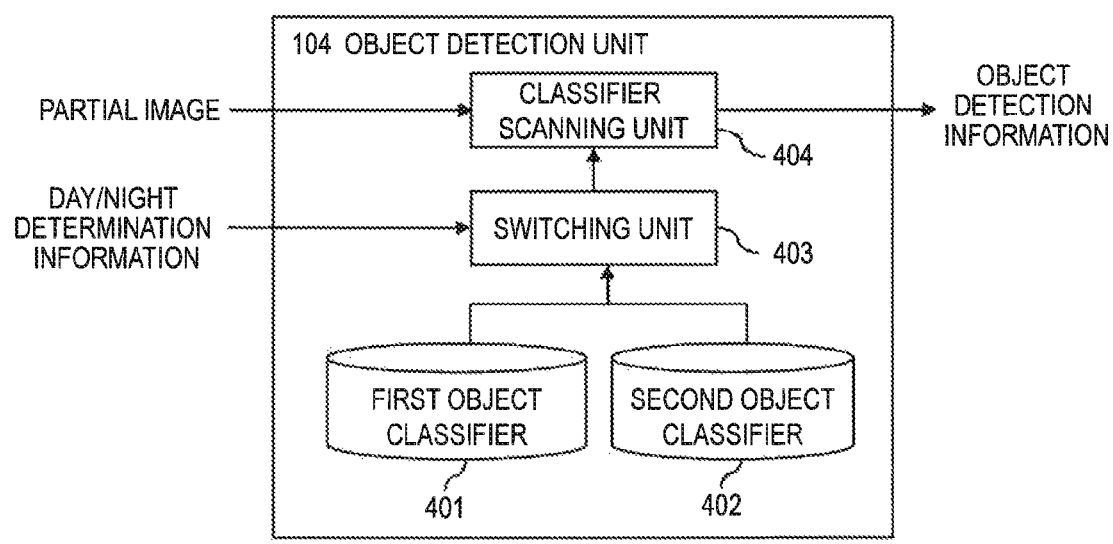
FIG. 4 is an explanatory diagram of an object detection unit in Embodiment 1 of this invention.
Figure 5A:
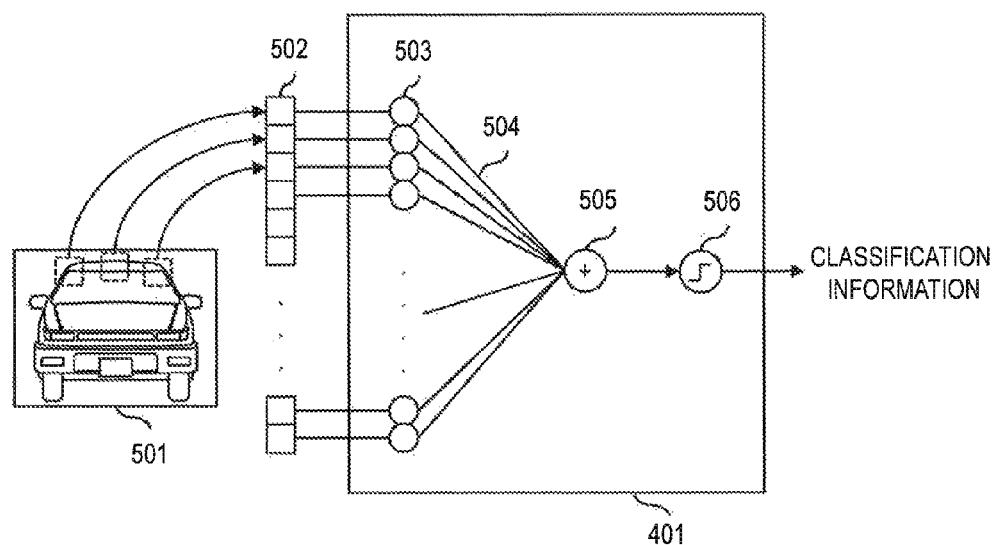
FIG. 5A is an explanatory diagram of an object classifier in Embodiment 1 of this invention.
Figure 5B:
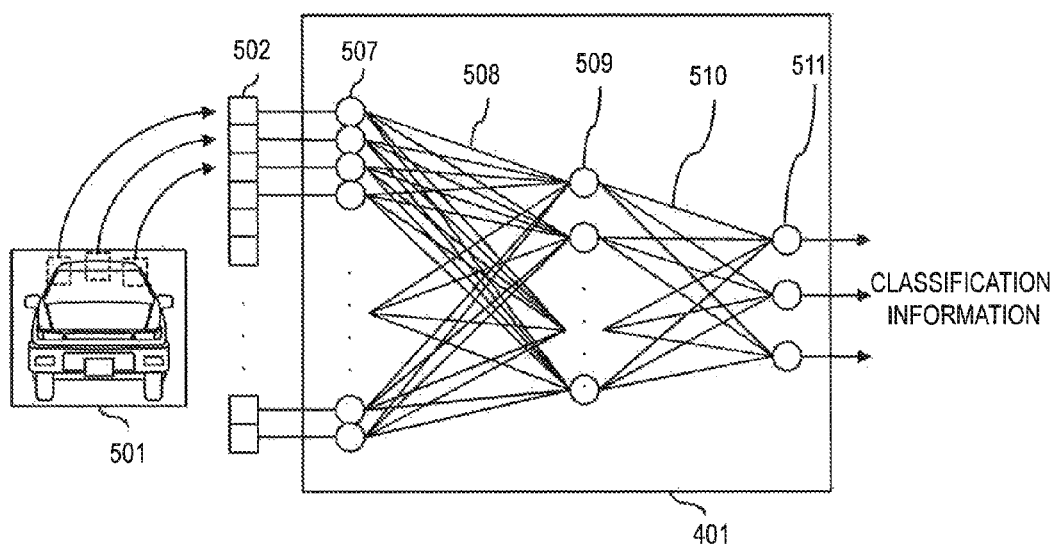
FIG. 5B is an explanatory diagram of a modified example of the object classifier in Embodiment 1 of this invention.

Next, the object detection unit 104 is described with FIGS. 4, 5A and 5B.

FIG. 4 is an explanatory diagram of the object detection unit 104 in Embodiment 1 of this invention.

The object detection unit 104 includes a first object classifier 401, a second object classifier 402, a switching unit 403, and a classifier scanning unit 404. The first object classifier 401 and the second object classifier 402 are generally referred to as object classifier as necessary.

The first object classifier 401 and the second object classifier 402 are classifiers for detecting specific objects such as a vehicle, a pedestrian, a bicycle, and a motorbike; the first object classifier 401 is a classifier for detecting an object during the daytime and the second object classifier 402 is a classifier for detecting an object during the nighttime. The first object classifier 401 and the second object classifier 402 hold pixel intensity patterns of object appearances; the second object classifier 402 particularly includes patterns having high pixel intensity such as patterns of vehicle headlights.

The switching unit 403 determines whether it is daytime or nighttime using day/night determination information. When determining it is daytime, the switching unit 403 uses the first object classifier 401 to detect an object; when determining it is nighttime, the switching unit 403 uses the second object classifier 402 to detect an object. The day/night determination information may be the gain of the wide-angle camera 1 or the current time. For example, in the case where the day/night determination information is the gain of the wide-angle camera 1, the switching unit 403 determines that it is nighttime if the gain of the wide-angle camera 1 is a predetermined value or more and determines that it is daytime if the gain of the wide-angle camera 1 is less than the predetermined value. In the case where the day/night determination information is the current time, the switching unit 403 determines that it is daytime if the current time is earlier than a predetermined time and determines that it is nighttime if the current time is later than the predetermined time.

The classifier scanning unit 404 scans a partial image fed to the object detection unit 104 and uses the first object classifier 401 or the second object classifier 402 to detect an object from the partial image.

FIG. 5A is an explanatory diagram of the object classifier in Embodiment 1 of this invention.

The classifier scanning unit 404 scans a partial image 501 to be scanned to detect a specific object with the object classifier. The following describes a case where the object classifier detects a vehicle from the partial image 501 by way of example.

The first object classifier 401 includes weak classifiers 503, a weighting coefficient 504, a summation unit 505, and a sign function 506. Each weak classifier 503 inputs one of T feature vectors 502 of the scanned partial image 501 to a function ($h_t(x)$) expressed as Formula 1. In Formula 1, the $f_t(x)$ represents a t-th feature vector and θ represents a threshold value. If the t-th feature vector ($f_t(x)$) is larger than the threshold value, $h_t(x)$ returns 1; if the t-th feature vector ($f_t(x)$) is equal to or smaller than the threshold value, $h_t(x)$ returns −1. The weighting coefficient 504 adds a weight to the output of the weak classifier 503. The summation unit 505 calculates the total sum of the outputs of the weak classifiers 503 weighted by the weighting coefficient 504. The sign function 506 inputs the output of the summation unit 505 and outputs classification information.

$$h_t(x) = \begin{cases} +1 & \text{if } f_t(x) > \theta_t \\ -1 & \text{otherwise} \end{cases} \quad \text{Formula 1}$$

The first object classifier 401 can be expressed as Formula 2. In Formula 2, H(x) represents the first object classifier 401, x represents a feature vector 502, $h_t(x)$ represents a weak classifier 503, and αt represents the weighting coefficient 504 of the weak classifier 503. The first object classifier 401 is implemented by weighted votes of the weak classifiers 503. In Formula 2, sign( ) represents the sign function 506, which returns +1 if the value in the parentheses in the right side of Formula 2 is a positive value and returns −1 if the value in the parentheses in the right side of Formula 2 is a negative value.

$$H(x) = \text{sign}\left(\sum_{t=1}^{T} \alpha_t h_t(x)\right) \quad \text{Formula 2}$$

The feature vectors 502 are assumed to be Haar-like features (differences in average of pixel intensities between areas) or HoG (histogram of oriented gradients) features; however, the feature vectors 502 may be of a different kind of feature or co-occurrence feature values obtained by combining different kinds of feature values. For learning of selecting feature vectors and learning of the weighting coefficient, techniques of AdaBoost or logistic linear regression can be used.

FIG. 5B is an explanatory diagram of a modified example of the object classifier in Embodiment 1 of this invention.

The object classifier (multi-class classifier) illustrated in FIG. 5B is configured for a plurality of kinds of objects and detects an object matching the partial image 501 from the plurality of kinds of objects. The object classifier in FIG. 5B includes input units (an input layer) 507, a first weighting coefficient 508, hidden units (a hidden layer) 509, a second weighting coefficient 510, and output units (an output layer) 511.

Each input unit 507 is fed with one of T feature vectors 502. The first weighting coefficient 508 adds weights to the outputs of the input units 507.

Each hidden unit 509 nonlinearly transforms linearly-coupled outputs of the input units 507 and the first weighting coefficient 508. This embodiment employs a sigmoid function expressed in Formula 3 as the function for the nonlinear transformation of the hidden unit 509. In Formula 3, $g_w(x)$ represents the output of a hidden unit 509, x represents the output of an input unit 507, and w represents the first weighting coefficient 508.

$$g_w(x) = \frac{1}{1+e^{-w^T x}} \quad \text{Formula 3}$$

The second weighting coefficient 510 adds weights to the outputs of the hidden units 509. Each output unit 511 calculates a classification probability of the class (for example, vehicles, pedestrians, or motorcycles). Although FIG. 5B shows three output units 511, the number is not limited to this. The number of output units 511 is equal to the number of kinds of objects detectable by the object classifier. Increasing output units 511 increases the kinds of objects detectable by the object classifier, such as two-wheel vehicles, road signs, baby strollers, and the like, in addition to vehicles, pedestrians, and motorcycles.

The object classifier in FIG. 5B is an example of a three-layer neural network; the object classifier learns the first weighting coefficient 508 and the second weighting coefficient 510 with the error backpropagation method. The object classifier in FIG. 5B is not limited to the neural network, but may be a deep neural network in which a multilayer perceptron and multiple hidden layers are stacked. In the case of deep neural network, the object classifier can learn the first weighting coefficient 508 and the second weighting coefficient 510 with deep learning.

Figure 6A:
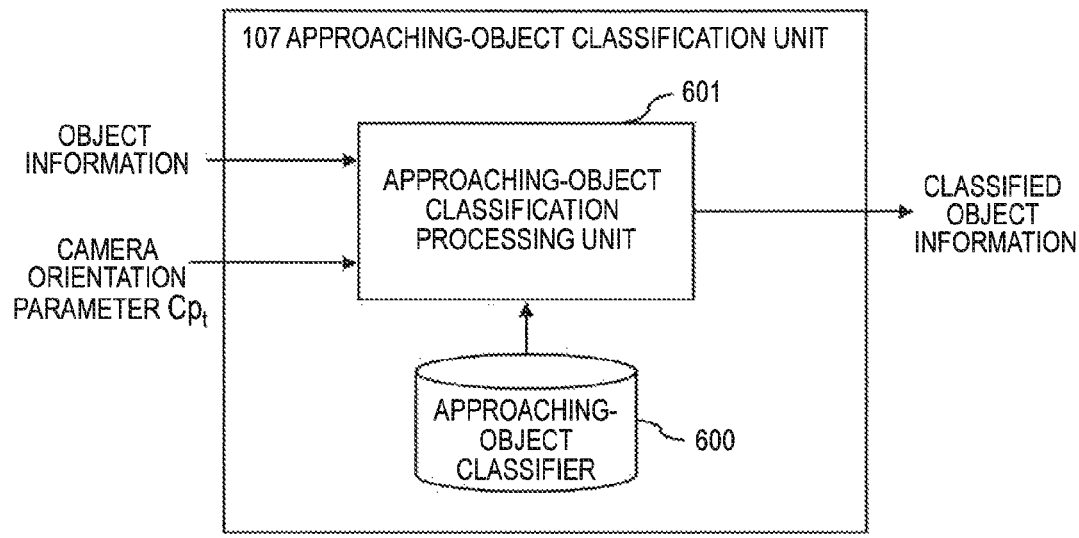
FIG. 6A is an explanatory diagram of an approaching-object classification unit in Embodiment 1 of this invention.
Figure 6B:
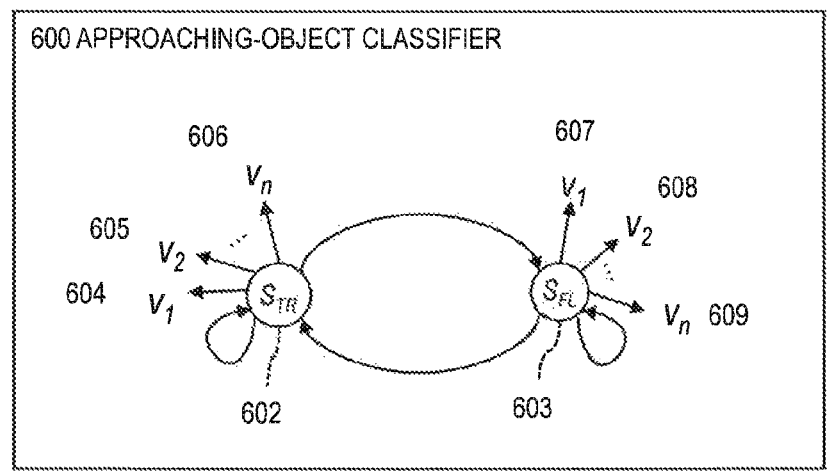
FIG. 6B is an explanatory diagram of the approaching-object classifier in Embodiment 1 of this invention.

Next, the approaching-object classification unit 107 is described with FIGS. 6A and 6B.

FIG. 6A is an explanatory diagram of the approaching-object classification unit 107 in Embodiment 1 of this invention.

The approaching-object classification unit 107 includes an approaching-object classifier 600 and an approaching-object classification processing unit 601. The approaching-object classifier 600 is a classifier for classifying an object detected by the object detection unit 104 and the object tracking unit 105 as an approaching object or not based on the variation with time in feature value of the object. The approaching-object classifier 600 can be a hidden Markov model (HMM) and is described in detail with FIG. 6B. The approaching-object classification processing unit 601 detects an approaching object by classifying an object detected by the object detection unit 104 and the object tracking unit 105 as an approaching object.

FIG. 6B is an explanatory diagram of the approaching-object classifier 600 in Embodiment 1 of this invention.

The approaching-object classifier 600 holds a state 602 ($S_{TR}$) indicating that an object is approaching and a state 603 ($S_{FL}$) indicating that an object is not approaching. Denoted as 604 to 609 in FIG. 6B correspond to the variation with time (observed value) of the feature vector (V={$v_1$, $v_2$, $v_3$, ... $v_n$}) calculated in the processing of S3008 in FIG. 3. For example, an observed value is defined as a variation of the feature vector in ten frames. As the feature vector, at least one of the width of the object in the image, the height of the object in the image, the coordinates of the grounding point of the object, the motion vector, the edge strength of the object, the texture frequency, the rectangle expansion rate, and the pixel count of the object is calculated as described in the description of the processing of S3008 in FIG. 3.

The approaching-object classifier 600 in this embodiment holds a state transition probability matrix A and an observation probability matrix B as parameters to detect an approaching object.

First, the state transition probability matrix A is described. The state transition probability matrix A defines the transition probability between states (the probability of transition from the state 602 to the state 603 or the probability of transition from the state 603 to the state 602) and can be expressed as Formula 4. In Formula 4, $q_t$ represents the state at a time t, $q_{t+1}$ represents the state at a time t+1, and $a_{ij}$ represents a probability (state transition probability) that the state may change from $S_i$ to $S_j$ between the time t and the time t+1.

$A=\{a_{ij}\}$ $a_{ij}=P[q_{t+1}=S_j|q_t=S_i]$ \quad Formula 4

Next, the observation probability matrix B is described. The observation probability matrix B defines the probability that an observation value $v_k$ will be obtained in a state (the state 602 or the state 603) and can be expressed as Formula 5. In Formula 5, $b_j(k)$ represents the probability that the observation value $v_k$ will be obtained in the state $S_j$. For example, the state 602 ($S_{TR}$) indicating that an object is approaching is likely to show variation with time in feature vector in such a manner that the distance to the object gradually becomes smaller, that is, the motion vector gradually becomes larger. On the other hand, the state 603 ($S_{FL}$) indicating that the object is not approaching is unlikely to show such variation with time in feature vector. The observation probability matrix B is provided to express such knowledge in probability.

$B=\{b_j(k)\}$ $b_j(k)=P[v_k \text{ at } t|q_t=S_j]$ \quad Formula 5

The approaching-object classifier 600 can preparatorily learn the state transition probability matrix A and the observation probability matrix B using the Baum-Welch algorithm.

The approaching-object classifier 600 calculates the state transition probability based on the previous state of the object determined by the approaching-object classification unit 107 and the state transition probability matrix A and calculates the observation probability based on the variations with time in individual feature vectors and the observation probability matrix B. The approaching-object classifier 600 calculates a probability that the object is in the state 602 and a probability that the object is in the state 603 based on these state transition probability and observation probability and feeds the obtained probabilities to the approaching-object classification processing unit 601. The approaching-object classification processing unit 601 compares the received two probabilities and determines that the state having the higher probability is the state of the object.

Figure 7:
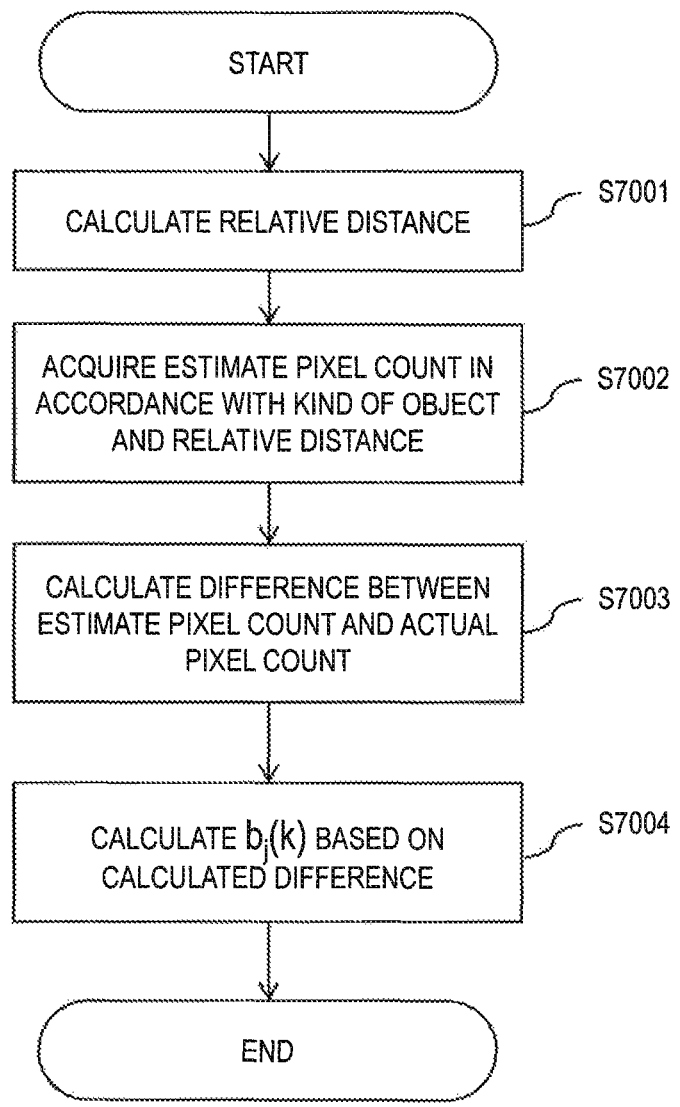
FIG. 7 is a flowchart of calculating an observation probability in Embodiment 1 of this invention in the case of the object pixel count.

Next, an example of a method of calculating an observation probability in object pixel count calculated as a feature vector is described with FIG. 7. FIG. 7 is a flowchart of calculating an observation probability in Embodiment 1 of this invention in the case of the object pixel count. This calculation is performed by the approaching-object classification processing unit 601.

First, the approaching-object classification processing unit 601 calculates a relative distance from the wide-angle camera 1 to the object based on the camera orientation parameter $Cp_t$ as of the input time and the coordinates of the grounding point of the object (S7001).

Specifically, the approaching-object classification processing unit 601 locates the ground in the image that has been corrected in distortion by the distortion correction unit 103. The approaching-object classification processing unit 601 calculates distances from the wide-angle camera 1 to points on the located ground based on the camera orientation parameter $Cp_t$ to calculate the distance from the wide-angle camera 1 to the grounding point of the object. That is to say, the approaching-object classification processing unit 601 converts the coordinates in the image (a coordinate X and a coordinate Y) into the world coordinates (a coordinate WX, a coordinate WY, and a coordinate WZ) to calculate the distance from the wide-angle camera 1 to the grounding point of the object.

Next, the approaching-object classification processing unit 601 acquires an estimate pixel count in accordance with the kind of the object detected by the object detection unit 104 and the object tracking unit 105 and the relative distance calculated in the processing of S7001 (S7002). It is assumed that the estimate pixel count be predetermined in relation to the kind of the object and the relative distance. For example, a vehicle at a relative distance of 20 m has an estimate horizontal pixel count of 20.

Next, the approaching-object classification processing unit 601 calculates a difference between the acquired estimate pixel count and the actual pixel count of the object (object pixel count) (S7003). Subsequently, the approaching-object classification processing unit 601 calculates an observation probability bj(k) in object pixel count based on the difference calculated in the processing of S7003 (S7004) and terminates the processing.

Specifically, the larger the difference calculated in the processing of S7003, the higher the possibility that the object detection unit 104 and the object tracking unit 105 has detected the object falsely; accordingly, the approaching-object classification processing unit 601 calculates the observation probability $b_j(k)$ in object pixel count of the state 602 indicating that the object is approaching as lower and the observation probability $b_j(k)$ in object pixel count of the state 603 indicating that the object is not approaching as higher. In contrast, the smaller the difference calculated in the processing of S7003, the lower the possibility that the object detection unit 104 and the object tracking unit 105 has detected the object falsely; accordingly, the approaching-object classification processing unit 601 calculates the observation probability $b_j(k)$ in object pixel count of the state 602 indicating that the object is approaching as higher and the observation probability $b_j(k)$ in object pixel count of the state 603 indicating that the object is not approaching as lower.

As described above, the observation probability $b_j(k)$ in object pixel count is calculated by calculating the relative distance from the wide-angle camera 1 to the object based on the camera orientation parameter $Cp_t$ and the coordinates of the grounding point and considering the difference between the estimate pixel count for the calculated relative distance and the object pixel count. This calculation enables the approaching-object classification unit 107 to take account of the difference between the estimate pixel count and the object pixel count in classifying an object as approaching object or not, preventing an object falsely detected by the object detection unit 104 and the object tracking unit 105 from being classified as an approaching object.

Calculating state observation probabilities $b_j(k)$ in other feature vectors is described briefly. If the variation with time in feature vector is specific to an approaching object, the approaching-object classification unit 107 calculates the observation probability $b_j(k)$ in the feature vector of the state 602 indicating that the object is approaching as higher. Examples of the variation with time in feature vector specific to an approaching object include that the motion vector gradually becomes larger, that the edge strength gradually becomes higher, that the texture frequency shifts into higher bandwidth, that the rectangle expansion rate is positive, and that the relative distance gradually becomes smaller as the time passes.

As understood from the above, the approaching-object classification unit 107 calculates the observation probability $b_j(k)$ based on the variation with time in feature vector. The approaching-object classification unit 107 then classifies the current state of an object as the state 602 ($S_{TR}$) indicating that the object is approaching or the state 603 ($S_{FL}$) indicating that the object is not approaching based on the state transition probability $a_{ij}$ and the observation probability $b_j(k)$ using a state recognition algorithm (for example, a Viterbi algorithm) in the hidden Markov model. The approaching-object classification unit 107 classifies the object as an approaching object if the state is classified as the state 602 and classifies the object as a non-approaching object if the state is classified as the state 603.

This embodiment detects an approaching object from a leftmost partial image and a rightmost partial image of an image captured by the wide-angle camera 1 using pattern matching to detect the approaching object at an earliest possible occasion. Using pattern matching to detect an approaching object achieves lower processing load to the approaching-object detection system 10 than using optical flow to detect an approaching object. However, detecting an approaching-object using pattern matching is more likely to lead to false detection of an approaching object.

False detection and correct detection are in a trade-off relationship where reducing the false detection reduces correct detection and increasing the correct detection increases false detection. As long as pattern matching based on an image captured at a single moment is used to detect an object, significant progress in solving this trade-off problem cannot be expected.

To address this problem, this embodiment provides the approaching-object classification unit 107 to the approaching-object detection system 10 to classify an object as an approaching object or not based on the variation with time in feature vector. Detecting an object by pattern matching at the object detection unit 104 and the object tracking unit 105 and eliminating false detection by pattern matching at the approaching-object classification unit 107 achieves a low false detection rate while maintaining a high detection rate even if the images captured by the wide-angle camera 1 include tiny objects. That is to say, an approaching object like a vehicle approaching at high speed from far away can be detected at an earliest possible occasion, enabling the approaching-object detection system 10 to output an alarm at least two seconds before the approaching object collides with the vehicle.

This embodiment detects approaching objects on the left and the right from the leftmost and rightmost partial images of images captured by the wide-angle camera 1; accordingly, the cost can be saved compared with a case where not the wide-angle camera 1 but two normal cameras (narrow-angle cameras) are mounted to detect approaching objects from images captured by these cameras.

This embodiment does not detect an approaching object from central partial images; accordingly, low processing load is achieved. However, a third approaching-object detection unit configured as the same as the first approaching-object detection unit 11 and the second approaching-object detection unit 12 may be provided to detect an approaching object from central partial images.

If the object classifier included in the object detection unit 104 is a multi-class classifier illustrated in FIG. 5B, the approaching-object detection system 10 can detect a plurality of kinds of objects such as vehicles, pedestrians, and motorcycles. Further, since the object detection unit 104 includes the first object classifier 401 for daytime and the second object classifier 402 for nighttime, the approaching-object detection system 10 can correctly detect an object independently from the environment when the wide-angle camera 1 captures images.

In addition, since the vehicle orientation estimation unit 102 successively calculates the camera orientation parameter $Cp_t$, the vehicle orientation estimation unit 102 can calculate a correct relative distance from the wide-angle camera 1 to an object, allowing a correct observation probability $b_j(k)$ in object pixel count to be calculated. As a result, reliable detection of an approaching object is achieved.

Embodiment 2

Hereinafter, Embodiment 2 of this invention is described with FIG. 8 and FIGS. 9A to 9D.

Embodiment 2 describes a vehicle 100 on which the approaching-object detection system 10 in Embodiment 1 is mounted. In this embodiment, the approaching-object detection system 10 in Embodiment 1 is implemented by software; however, it is needless to say that the approaching-object detection system 10 can be implemented by hardware.

Figure 8:
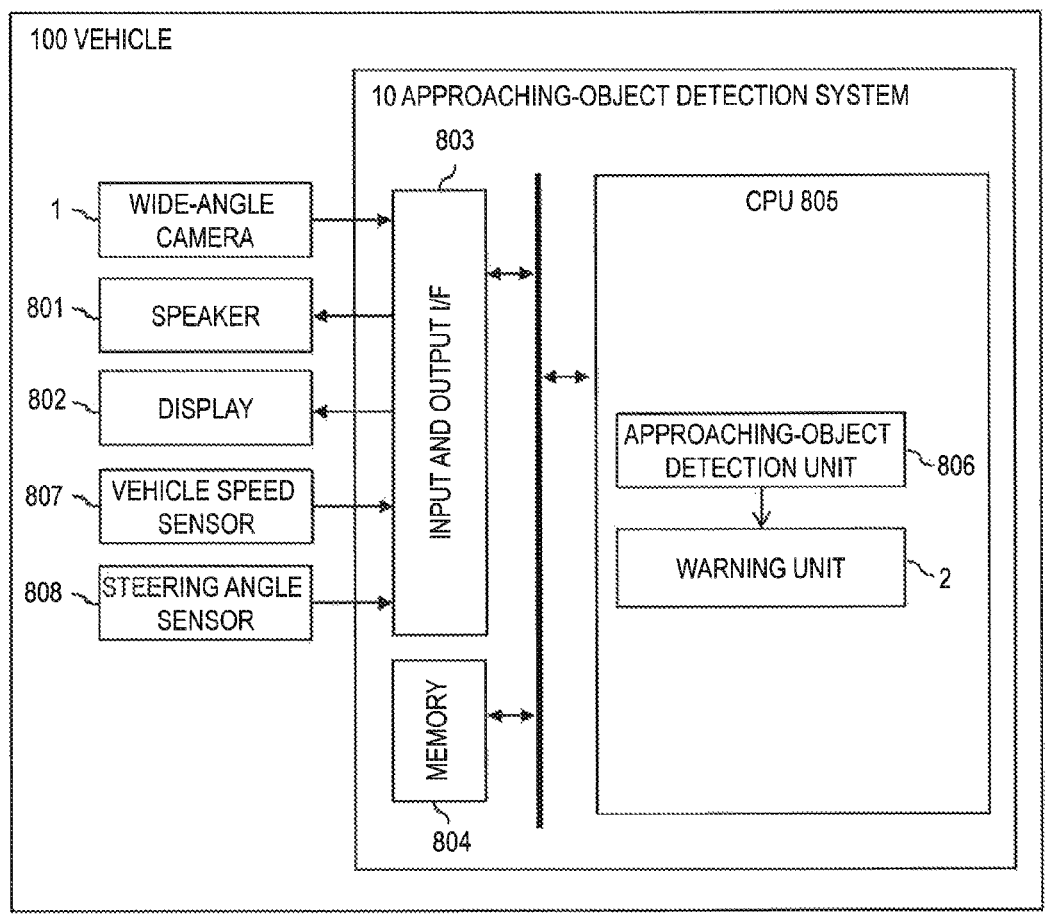
FIG. 8 is a block diagram of a vehicle in Embodiment 2 of this invention.

FIG. 8 is a block diagram of a vehicle 100 in Embodiment 2 of this invention. The components same as those in Embodiment 1 are denoted by the same reference signs and explanation thereof is omitted.

The vehicle 100 includes a wide-angle camera 1, a speaker 801, a display 802, a vehicle speed sensor 807, a steering angle sensor 808, and an approaching-object detection system 10.

The wide-angle camera 1 is mounted on the vehicle 100 and takes images of the periphery of the vehicle 100. The speaker 801 is provided inside the vehicle 100 and outputs an alarm sound when the approaching-object detection system 10 has detected an approaching object to warn the driver of the approaching object. The display 802 is provided inside the vehicle 100 and outputs an alarm screen when the approaching-object detection system 10 detects an approaching object to warn the driver of the approaching object. The vehicle speed sensor 807 measures the vehicle speed of the vehicle 100. The steering angle sensor 808 measures the steering angle of the vehicle 100. The approaching-object detection system 10 switches its own operation modes in accordance with the vehicle speed information indicating the vehicle speed measured by the vehicle speed sensor 807 and the steering angle information indicating the steering angle measured by the steering angle sensor 808. For example, if the vehicle speed is lower than a specific speed, the approaching-object detection system 10 regards the risk of collision as low and stops its operation.

The approaching-object detection system 10 includes an input/output interface (I/F) 803, a memory 804, and a CPU 805.

The input/output I/F 803 inputs and outputs data between the approaching-object detection system 10 and one of the wide-angle camera 1, the speaker 801, the display 802, the vehicle speed sensor 807, and the steering angle sensor 808. The memory 804 stores programs to be executed by the CPU 805 and data to be read and written by the CPU 805. The CPU 805 is a processing unit for computing and has functions of an approaching-object detection unit 806 and a warning unit 2.

The approaching-object detection unit 806 corresponds to the components (the extraction unit 101, the vehicle orientation estimation unit 102, the first approaching-object detection unit 11 and the second approaching-object detection unit 12) included in the approaching-object detection system 10 in Embodiment 1 and is implemented by the CPU 805 executing a program corresponding to the approaching-object detection unit 806. When the approaching-object detection unit 806 has detected an approaching object, the warning unit 2 sends an alarm output instruction to output an alarm sound from the speaker 801 and to output an alarm screen to the display 802 to the speaker 801 and the display 802 through the input/output I/F 803. The warning unit 2 does not need to send an alarm output instruction to both of the speaker 801 and the display 802 and may send an alarm output instruction to at least either the speaker 801 or the display 802.

Figure 9A:
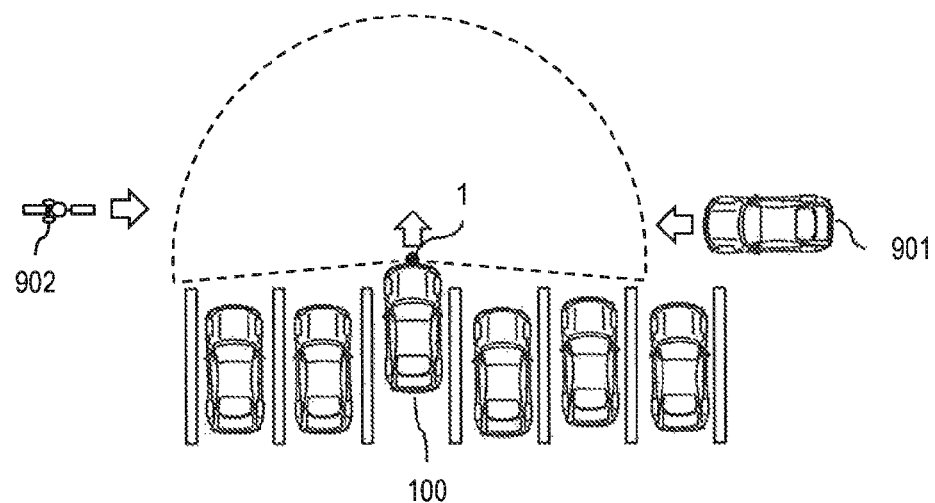
FIG. 9A is an explanatory diagram of examples of an approaching object to be detected by the approaching-object detection system in the case where the wide-angle camera is mounted on the front of the vehicle in Embodiment 2 of this invention.

FIG. 9A is an explanatory diagram of examples of an approaching object to be detected by the approaching-object detection system 10 in the case where the wide-angle camera 1 is mounted on the front of the vehicle 100 in Embodiment 2 of this invention.

In the case where the wide-angle camera 1 is mounted on the front of the vehicle 100, the approaching-object detection system 10 can detect an object approaching the front of the vehicle 100 from the left (the two-wheel vehicle 902 in FIG. 9A) and an object approaching the front of the vehicle 100 from the right (the vehicle 901 in FIG. 9A).

Since the approaching-object detection system 10 can detect objects approaching the front of the vehicle 100 from the left and the right, the approaching-object detection system 10 can assist the driver who starts moving the vehicle 100 forward (for example, when the driver starts moving forward the vehicle 100 stopped at an intersection or a parking lot).

The approaching-object detection system 10 may calculate a risk caused by an approaching object after detecting the approaching object and change the kind of the alarm to be output in accordance with the calculated risk. The risk caused by the approaching object is calculated based on, for example, the distance between the wide-angle camera 1 and the approaching object. For example, the risk is calculated to be higher as the distance between the wide-angle camera 1 and the approaching object is smaller.

It should be noted that the approaching-object detection system 10 may change the kind of the alarm to be output depending on the risk in such a manner that the approaching-object detection system 10 should output an alarm only when the risk is a predetermined level or higher and should not output an alarm when the risk is lower than the predetermined level.

Figure 9B:
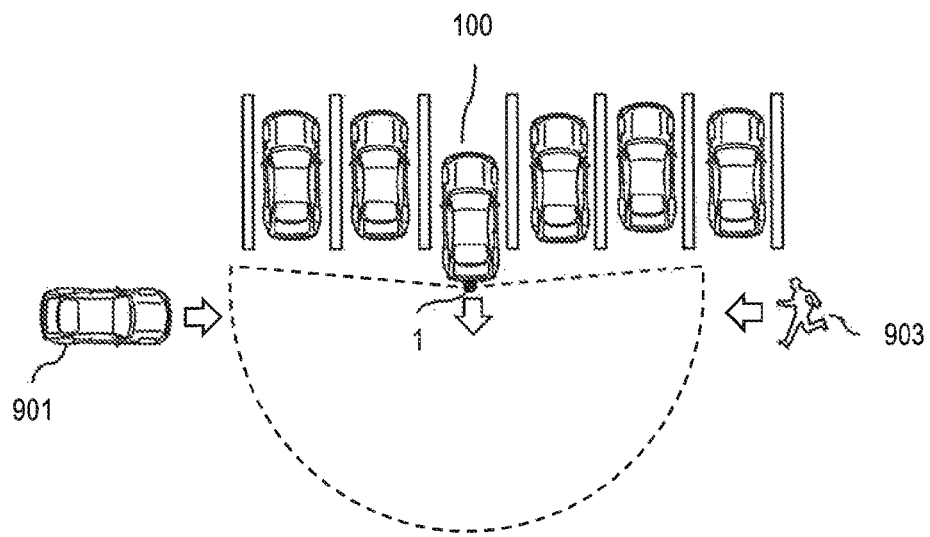
FIG. 9B is an explanatory diagram of examples of an approaching object to be detected by the approaching-object detection system in the case where the wide-angle camera is mounted on the rear of the vehicle in Embodiment 2 of this invention.

FIG. 9B is an explanatory diagram of examples of an approaching object to be detected by the approaching-object detection system 10 in the case where the wide-angle camera 1 is mounted on the rear of the vehicle 100 in Embodiment 2 of this invention.

In the case where the wide-angle camera 1 is mounted on the rear of the vehicle 100, the approaching-object detection system 10 can detect an object approaching the rear of the vehicle 100 from the left (the vehicle 901 in FIG. 9B) and an object approaching the rear of the vehicle 100 from the right (the pedestrian 903 in FIG. 9B).

Since the approaching-object detection system 10 can detect objects approaching the rear of the vehicle 100 from the left and the right, the approaching-object detection system 10 can assist the driver who backs the vehicle 100, for example.

Figure 9C:
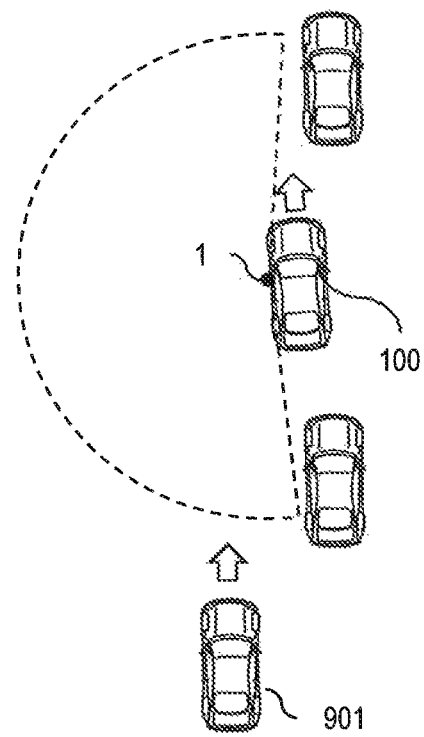
FIG. 9C is an explanatory diagram of examples of an approaching object to be detected by the approaching-object detection system in the case where the wide-angle camera is mounted on the left side of the vehicle in Embodiment 2 of this invention.

FIG. 9C is an explanatory diagram of examples of an approaching object to be detected by the approaching-object detection system 10 in the case where the wide-angle camera 1 is mounted on the left side of the vehicle 100 in Embodiment 2 of this invention.

In the case where the wide-angle camera 1 is mounted on the left side of the vehicle 100, the approaching-object detection system 10 can detect an object approaching from the left front of the vehicle 100 and an object approaching from the left rear of the vehicle 100 (the vehicle 901 in FIG. 9C).

Since the approaching-object detection system 10 can detect objects approaching from the left rear and the left front of the vehicle 100, the approaching-object detection system 10 can assist the driver who changes lanes from the right to the left, for example. Further, since the approaching-object detection system 10 can calculate an accurate amount of movement by using the information measured by the vehicle-speed sensor 807 and the steering angle sensor 808, the approaching-object detection system 10 can determine the risk of collision more properly, considering the speed of the approaching object and the amount of leftward movement of the vehicle 100.

Figure 9D:
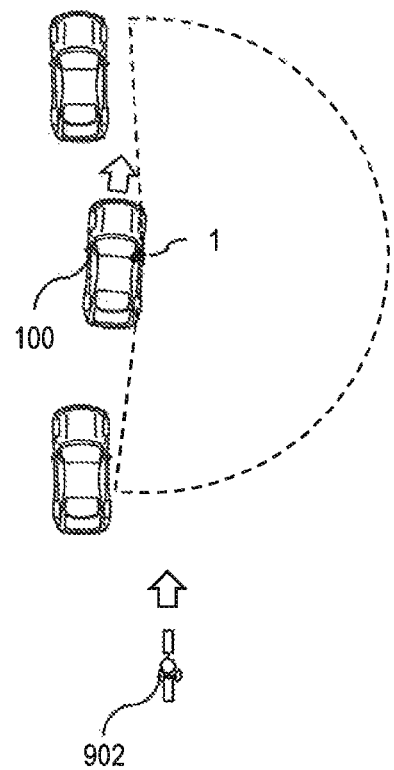
FIG. 9D is an explanatory diagram of examples of an approaching object to be detected by the approaching-object detection system in the case where the wide-angle camera is mounted on the right side of the vehicle in Embodiment 2 of this invention.

FIG. 9D is an explanatory diagram of examples of an approaching object to be detected by the approaching-object detection system 10 in the case where the wide-angle camera 1 is mounted on the right side of the vehicle 100 in Embodiment 2 of this invention.

In the case where the wide-angle camera 1 is mounted on the right side of the vehicle 100, the approaching-object detection system 10 can detect an object approaching from the right front of the vehicle 100 and an object approaching from the right rear of the vehicle 100 (the two-wheel vehicle 902 in FIG. 9D).

Since the approaching-object detection system 10 can detect objects approaching from the right rear and the right front of the vehicle 100, the approaching-object detection system 10 can assist the driver who changes lanes from the left to the right, for example. Further, since the approaching-object detection system 10 can calculate an accurate amount of movement by using the information measured by the vehicle-speed sensor 807 and the steering angle sensor 808, the approaching-object detection system 10 can determine the risk of collision more properly, considering the speed of the approaching object and the amount of rightward movement of the vehicle 100.

It should be noted that the objects approaching from the rear shown in FIGS. 9C and 9D can be detected by the approaching-object detection system 10 in the case where the wide-angle camera 1 is mounted on the rear of the vehicle 100.

As described above, the approaching-object detection system 10 mounted on the vehicle 100 can detect an approaching object from the images captured by the wide-angle camera 1 attached to the vehicle 100 and implement a collision warning system for outputting alarms from the speaker 801 and the display 802 to assist the driver who drives the vehicle 100.

By attaching the wide-angle camera 1 on the front or the rear of the vehicle 100, the approaching-object detection system 10 can serve as a side approaching-object detection system that outputs an alarm when detecting an object approaching from the sides of the vehicle 100. By attaching the wide-angle camera 1 on the rear, the left side, or the right side of the vehicle 100, the approaching-object detection system 10 can serve as a rear approaching-object detection system that outputs an alarm when detecting an object approaching from behind the vehicle 100.

Embodiment 3

Hereinafter, Embodiment 3 of this invention is described with FIGS. 10 and 11.

This embodiment describes an example in which wide-angle cameras 1A to 1D (generally referred to as wide-angle camera 1 as necessary) are mounted on a vehicle 100 and the approaching-object detection system 10 selects a wide-angle camera 1 to capture images to be used in detecting an approaching object depending on the condition of the vehicle 100. In this embodiment, the components same as those in Embodiments 1 and 2 are denoted by the same reference signs and explanation thereof is omitted.

Figure 10:
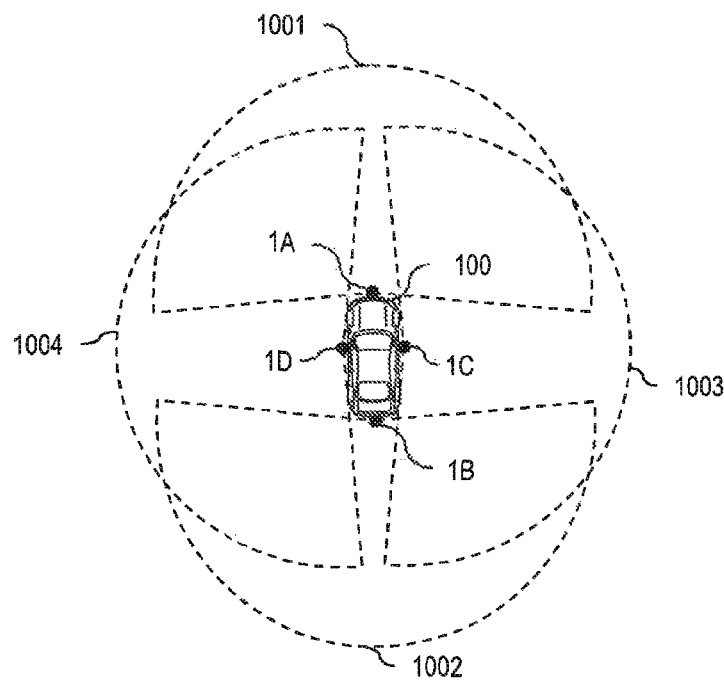
FIG. 10 is an explanatory diagram of capture ranges of the wide-angle cameras attached on the vehicle in Embodiment 3 of this invention, and, FIG. 11 is an explanatory diagram of an approaching-object detection system to be mounted on the vehicle in Embodiment 3 of this invention.

FIG. 10 is an explanatory diagram of capture ranges of the wide-angle cameras 1 attached on the vehicle 100 in Embodiment 3 of this invention.

The wide-angle camera 1A is attached on the front of the vehicle 100; the wide-angle camera 1B is attached on the rear of the vehicle 100; the wide-angle camera 1C is attached on the right side of the vehicle 100; and the wide-angle camera 1D is attached on the left side of the vehicle 100.

The wide-angle camera 1A can capture a range (1001) from the left to the right in front of the vehicle 100; the wide-angle camera 1B can capture a range (1002) from the left to the right behind the vehicle 100; the wide-angle camera 1C can capture a range (1003) from the front to the rear on the right side of the vehicle 100; and the wide-angle camera 1D can capture a range (1004) from the front to the rear on the left side of the vehicle 100.

This attaching the four wide-angle cameras 1 having a view angle of approximately 180 degrees to the vehicle 100 enables the entire periphery of the vehicle 100 to be captured. It should be noted that the number of wide-angle cameras 1 attached on the vehicle 100 should be a plural number but is not limited to four.

Figure 11:
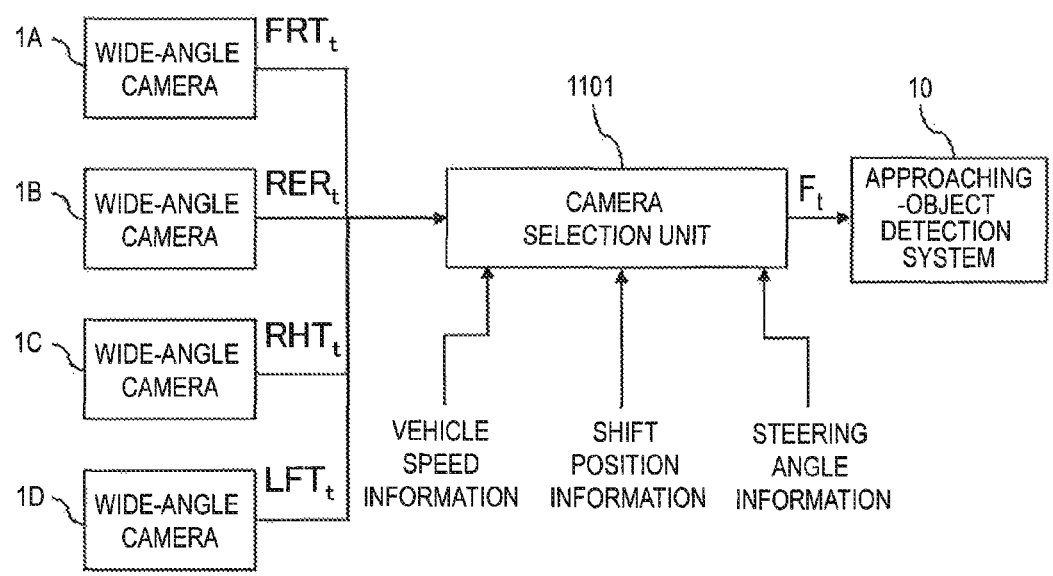

FIG. 11 is an explanatory diagram of an approaching-object detection system 10 to be mounted on the vehicle 100 in Embodiment 3 of this invention.

In the approaching-object detection system 10, a camera selection unit 1101 is fed with images ($FRT_t$, $RER_t$, $RHT_t$, and $LFT_t$) captured by the four wide-angle cameras 1A to 1D, selects one wide-angle camera 1 based on the conditions (for example, the vehicle speed information, shift position information, and steering angle information) of the vehicle 100, and feeds an image $F_t$ captured by the selected wide-angle camera 1 to the approaching-object detection system 10.

For example, if the vehicle speed is higher than a predetermined speed and the steering angle is between 0 and a predetermined angle, the camera selection unit 1101 selects the wide-angle camera 1A attached on the front of the vehicle 100 and feeds the image $FRT_t$ captured by the wide-angle camera 1A to the approaching-object detection system 10. If the shift position is the back position and the steering angle is between 0 and a predetermined angle, the camera selection unit 1101 selects the wide-angle camera 1B attached on the rear of the vehicle 100 and feeds the image RER$_t$ captured by the wide-angle camera 1B to the approaching-object detection system 10.

If the vehicle speed is higher than a predetermined speed and the steering angle indicates rightward turning, the camera selection unit 1101 selects the wide-angle camera 1C attached on the right side of the vehicle 100 and feeds the image RHT$_t$ captured by the wide-angle camera 1C to the approaching-object detection system 10. If the vehicle speed is higher than a predetermined speed and the steering angle indicates leftward turning, the camera selection unit 1101 selects the wide-angle camera 1D attached on the left side of the vehicle 100 and feeds the image LFT$_t$ captured by the wide-angle camera 1D to the approaching-object detection system 10.

The approaching-object detection system 10 detects an approaching object based on the images captured by the wide-angle camera 1 selected by the camera selection unit 1101.

As described above, this embodiment selects one wide-angle camera 1 that has captured the images to be used in detecting an approaching object among the plurality of wide-angle cameras 1 attached on the vehicle 100 depending on the conditions of the vehicle 100; accordingly, the approaching-object detection system 10 can detect an object approaching from a direction appropriate in accordance with the conditions of the vehicle 100, which achieves low processing load to the approaching-object detection system 10, compared with the case of detecting an approaching object based on the images captured by all the wide-angle cameras 1.

Furthermore, the approaching-object detection system 10 can detect an object approaching the vehicle 100 from any direction by attaching wide-angle cameras 1 on the front, the rear, the left side, and the right side of the vehicle 100.

This invention is not limited to the embodiment described above, and includes various modification examples. For instance, the embodiment given above is a detailed description that is written for easy understanding of this invention, and this invention is not necessarily limited to a mode that includes all the components described. Replacing some components of one embodiment with components of another embodiment is also an option. Components of one embodiment may be added with components of another embodiment. For some components in each embodiment, other components may be added or deleted or may substitute.

Some of or all of the components, functions, processing parts, processing measures, and the like described above may be implemented by hardware by, for example, designing those in the form of an integrated circuit. Alternatively, the components, functions, and the like described above may be implemented by software by having a processor interpret and execute programs that respectively implement the described functions. Programs, tables, files, and other types of information for implementing the described functions can be put in a memory, a recording device such as a hard disk or a solid state drive (SSD), or a recording medium such as an IC card, an SD card, or a DVD.

What is claimed is:

1. An approaching-object detection system for detecting an approaching object based on images captured by an imaging device, the approaching-object detection system comprising:
an extraction unit configured to extract a partial image of one far side and a partial image of the other far side from each of the images;
a distortion correction unit configured to correct distortion of the partial images extracted by the extraction unit;
an object detection unit configured to detect an object from the partial images corrected in distortion by the distortion correction unit through pattern matching with reference to preinstalled image information on the object;
an approaching-object classification unit configured to classify the detection result of the object detection unit as an approaching object or not; and
an orientation estimation unit configured to estimate an orientation of the imaging device,
wherein the approaching-object classification unit is configured to:
calculate a feature value of the object detected by the object detection unit; and
classify the object as approaching object or not based on a variation with time in the calculated feature value of the object, and
wherein the approaching-object detection unit is configured to:
locate a grounding point of the object detected by the object detection unit in the partial images corrected in distortion by the distortion correction unit;
calculate a relative distance from the imaging device to the object based on the orientation of the imaging device estimated by the orientation estimation unit and the located grounding point;
estimate a pixel count of the object based on the calculated relative distance and a kind of the object detected by the object detection unit; and
determine whether the object is an approaching object or not in consideration of a difference between the estimated pixel count and an actual pixel count of the object.

2. The approaching-object detection system according to claim 1, wherein the approaching-object classification unit is configured to calculate, as the feature value of the object, at least one of a width of the object in the partial images, a height of the object in the partial images, coordinates of the grounding point of the object, a motion vector of the object, an edge strength, a texture frequency, a rectangle expansion rate, and an actual pixel count of the object in the partial images.

3. A vehicle on which the approaching-object detection system according to claim 1 is mounted, wherein the imaging device is attached on at least one of front, rear, and sides of the vehicle.

4. The vehicle according to claim 3, further comprising a warning notification unit for issuing a warning in a case where the approaching-object classification unit classifies the detection result as an approaching object.

5. An approaching-object detection system for detecting an approaching object based on images captured by an imaging device, the approaching-object detection system comprising:
an extraction unit configured to extract a partial image of one far side and a partial image of the other far side from each of the images;
a distortion correction unit configured to correct distortion of the partial images extracted by the extraction unit;
an object detection unit configured to detect an object from the partial images corrected in distortion by the distortion correction unit through pattern matching with reference to preinstalled image information on the object;
an approaching-object classification unit configured to classify the detection result of the object detection unit as an approaching object or not;

an object tracking unit configured to track an object by comparing the partial images corrected in distortion by the distortion correction unit with an object previously classified as an approaching object; and a combined-determination unit configured to determine whether there is consistency between a detection result of the object detection unit and a tracking result of the object tracking unit based on the detection result and the tracking result, wherein the combined-determination unit is configured to:

determine that there is no consistency between the detection result and the tracking result in a case where the object detection unit newly detects an object and the object newly detected by the object detection unit is an object previously classified as an approaching object and is being tracked by the object tracking unit;

estimate a current position of the object previously classified as an approaching object using a position as of the previous classification in a case where the combined-determination unit determines that there is no consistency between the detection result and the tracking result; and output a result indicating the object positioned closer to the estimated current position between the detection result of the object detection unit and the tracking result of the object tracking unit to the approaching-object classification unit.

6. The approaching-object detection system according to claim 5, wherein the approaching-object classification unit is configured to:

calculate a feature value of the object detected by the object detection unit; and classify the object as approaching object or not based on a variation with time in the calculated feature value of the object.

7. The approaching-object detection system according to claim 6, wherein the approaching-object classification unit is configured to calculate, as the feature value of the object, at least one of a width of the object in the partial images, a height of the object in the partial images, coordinates of the grounding point of the object, a motion vector of the object, an edge strength, a texture frequency, a rectangle expansion rate, and an actual pixel count of the object in the partial images.

8. A vehicle on which the approaching-object detection system according to claim 5 is mounted, wherein the imaging device is attached on at least one of front, rear, and sides of the vehicle.

9. The vehicle according to claim 8, further comprising a warning notification unit for issuing a warning in a case where the approaching-object classification unit classifies the detection result as an approaching object.

10. A vehicle comprising:

an approaching-object detection system mounted on the vehicle, the approaching-object detection system being for detecting an approaching object based on images captured by an imaging device, the approaching-object detection system comprising:

an extraction unit configured to extract a partial image of one far side and a partial image of the other far side from each of the images;

a distortion correction unit configured to correct distortion of the partial images extracted by the extraction unit;

an object detection unit configured to detect an object from the partial images corrected in distortion by the distortion correction unit through pattern matching with reference to preinstalled image information on the object; and an approaching-object classification unit configured to classify the detection result of the object detection unit as an approaching object or not, wherein the imaging device is attached on at least one of front, rear, and sides of the vehicle, wherein a plurality of imaging devices are attached on the vehicle, and wherein the vehicle comprises an imaging device selection unit for selecting an imaging device to capture the images to be used in approaching-object classification in the approaching-object detection system based on speed information and steering angle information on the vehicle.

11. The vehicle according to claim 10, wherein the approaching-object classification unit is configured to:

calculate a feature value of the object detected by the object detection unit; and classify the object as approaching object or not based on a variation with time in the calculated feature value of the object.

12. The vehicle according to claim 11, wherein the approaching-object classification unit is configured to calculate, as the feature value of the object, at least one of a width of the object in the partial images, a height of the object in the partial images, coordinates of the grounding point of the object, a motion vector of the object, an edge strength, a texture frequency, a rectangle expansion rate, and an actual pixel count of the object in the partial images.

13. The vehicle according to claim 10, further comprising a warning notification unit for issuing a warning in a case where the approaching-object classification unit classifies the detection result as an approaching object.

* * * * *